United States Patent
Benitsch et al.

(10) Patent No.: US 7,037,602 B2
(45) Date of Patent: May 2, 2006

(54) MULTILAYER COMPOSITE

(75) Inventors: Bodo Benitsch, Buttenwiesen (DE); Udo Gruber, Neusaess (DE); Sven Schweizer, Augsburg (DE); Peter Winkelmann, Thierhaupten (DE)

(73) Assignee: SGL Carbon AG, (DE)

( * ) Notice: Subject to any disclaimer, the term of this patent is extended or adjusted under 35 U.S.C. 154(b) by 475 days.

(21) Appl. No.: 10/613,822

(22) Filed: Jul. 3, 2003

(65) Prior Publication Data
US 2006/0062984 A1 Mar. 23, 2006

(30) Foreign Application Priority Data
Jul. 4, 2002 (DE) ............................ 102 30 231

(51) Int. Cl.
*B32B 9/04* (2006.01)
*F02K 9/34* (2006.01)

(52) U.S. Cl. .................. 428/698; 428/408; 428/446; 428/293.4; 428/297.4; 428/213; 60/257

(58) Field of Classification Search ................ 60/257, 60/267; 428/408, 698, 293.4
See application file for complete search history.

(56) References Cited
U.S. PATENT DOCUMENTS 5,352,529 A 10/1994 Scanlon et al.
6,151,887 A 11/2000 Haidn et al.
6,182,442 B1 2/2001 Schmidt et al.
6,231,791 B1 5/2001 Heine et al.
6,261,981 B1 7/2001 Dietrich et al.
6,389,801 B1 5/2002 Papenburg et al.
2002/0028294 A1 3/2002 Krenkel et al.

FOREIGN PATENT DOCUMENTS

| DE | 197 10 105 | 9/1998 |
| DE | 197 11 829 | 9/1998 |
| DE | 197 30 674 | 1/1999 |
| DE | 197 30 674 A1 | 1/1999 |
| DE | 198 04 232 A1 | 8/1999 |
| DE | 198 34 018 | 2/2000 |
| DE | 198 58 197 | 6/2000 |
| EP | 0 918 976 B1 | 6/1999 |

*Primary Examiner*—Deborah Jones
*Assistant Examiner*—Daniel Miller
(74) *Attorney, Agent, or Firm*—Connolly Bove Lodge & Hutz LLP

(57) ABSTRACT

Multilayer composite for combustion chambers or nozzles of missiles, comprising an interior layer in contact with the combustion gases and an outer layer, wherein the interior layer is a fiber-reinforced ceramic whose matrix comprises phases of carbon and/or phases of silicon carbide and the outer layer is a polymer reinforced with carbon fibers, process for producing the same and combustion chambers and nozzles for missiles made of this composite.

12 Claims, No Drawings

MULTILAYER COMPOSITE

FIELD OF THE INVENTION

The present invention relates to a multilayer composite, in particular for combustion chambers for rocket engines and nozzles and also the nozzle inlet area of missiles, in particular rocket nozzles.

BACKGROUND OF THE INVENTION

Propelling nozzles and rings for rocket engines in boosters for space vehicles or for low-altitude rockets require materials which can withstand very high temperatures. In the case of the solid fuels customary for boosters, these temperatures can sometimes be above 3500° C. The thermal stress on the structural material of a ring or nozzle must not be above that which the material can survive without damage for at least the duration of combustion. The high-temperature-resistant metal alloys which have frequently been used hitherto, in particular in combination with insulation and cooling facilities, are increasingly being replaced by ceramic materials. Thus, in DE-A 197 30 674 a combustion chamber is disclosed, especially for rocket engines, whose interior wall is made of fiber-reinforced ceramic material or graphite and whose outer wall is likewise made of fiber-reinforced ceramic material. The fiber-reinforced ceramic material is preferably carbon reinforced with carbon fibers (C/C) and/or silicon carbide reinforced with carbon fibers (C/SiC). Coolant channels run between the interior and outer walls. In EP-B 0 918 976, a process is disclosed for producing missile components, including combustion chambers and propelling nozzles for missiles. In this process, individual fiber-reinforced ceramic blanks are produced from the materials C/SiC, C/C and/or silicon carbide reinforced with silicon carbide fibers (SiC/SiC) and joined together by means of joint infiltration with Si, SiC and/or carbon to produce the finished missile component. Preference is given to using a load-bearing structure having a high density and a thermally insulating lining having a high porosity and low density. Combustion chambers whose structural material is made up entirely of C/SiC are known from DE-A 198 04 232. The combustion chambers for high-performance engines described therein consist of an outer wall and an interior base body which is in contact with the hot gases and is provided with a large number of cooling channels. The outer wall comprises C/SiC reinforced with long fibers and the base body comprises C/SiC reinforced with short fibers. In this prior art, the effect of temperature on the load-bearing component of the combustion chamber is reduced partly by cooling channels and partly by a thermally insulating lining. Both modes of construction require additional space and make the overall construction heavier. Both available space and permissible weight are very restricted for small missiles in particular. For sustained-flight missiles, use is frequently made of ramjet engines which are equipped with additional solid fuel for the ignition phase. This solid fuel burns extremely quickly to give the rocket a high initial thrust. This phase of high initial acceleration is also referred to as the boost phase.

SUMMARY OF THE INVENTION

It is an object of the invention to provide a suitable material which makes it possible to produce ring, nozzles and combustion chambers of compact construction and has a high initial strength during the boost phase and a high long-term thermal stability and abrasion resistance, and also to provide an inexpensive process for producing it. This object is achieved by a multilayer composite for combustion chambers or nozzles of missiles, comprising an interior layer in contact with the combustion gases and an outer layer, wherein the interior layer is a fiber-reinforced ceramic whose matrix comprises phases of carbon and/or phases of silicon carbide and the outer layer is a polymer reinforced with carbon fibers.

The invention likewise provides a ring, nozzle or combustion chamber construction which comprises an interior layer of fiber-reinforced ceramic, preferably in gradated form, which is in contact with the combustion gases and an outer layer made of a fiber-reinforced polymer, and also provides a process which comprises liquid silicization of a porous carbon-containing intermediate body (C/C green body) in the form of the interior layer and the cladding of the silicized intermediate body with fiber-reinforced polymer (CFP).

DETAILED DESCRIPTION OF THE PREFERRED EMBODIMENTS

The fiber-reinforced ceramic, which is preferably in so-called graded form, consists of C/SiC (silicon carbide which is reinforced with carbon fibers and may further comprise additional phases of Si and/or carbon) and C/C (carbon reinforced with carbon fibers), with the two materials having a gradual transition between them. Particularly in the case of the rocket engines with integrated booster typical of small rockets, very high structural stresses are placed on the nozzle wall during the ignition and boost phase, and these stresses are no longer reached in the later phase (generally known as the sustained-flight phase). The nozzle and the ring therefore have to have a very high initial strength and then a high heat resistance and abrasion resistance. It is known that composites reinforced with long fibers have, if the fibers are aligned appropriately, a higher tensile strength in the fiber direction than do comparable composites reinforced with short fibers. This principle of long fiber reinforcement is described, for example, in DE-A 198 04 232.

In contrast to the prior art, the material producing the strength of the combustion chamber, the nozzle or the ring is according to the invention not a ceramic material having a high heat resistance, but a polymer or plastic material reinforced with carbon fibers (CFP). CFP has the decisive advantage that it has a substantially higher tensile strength than ceramics reinforced with carbon fibers. This applies to both C/C and C/SiC ceramics. Further advantages are that it can be produced more quickly and cheaply, in particular in comparison with C/SiC, and also the fact that CFP has a lower density than fiber-reinforced ceramics. However, after ignition of the engine, the polymer can withstand the high combustion temperatures for only a short time and is carbonized or burnt, so that the outer layer loses its strength after a short time.

It has surprisingly been found that the thermal destruction of the outer CFP layer progresses sufficiently slowly for the required support function to be maintained during the stresses imposed by the boost phase. After the transition from the boost phase to the phase of conventional sustained rocket flight, in particular by means of liquid fuels, the additional support function is no longer required, so that the destruction and burning of the CFP can be accepted. Furthermore, the components are constructed in such a way that the decomposition of the outer CFP layer causes no disadvantages at the join between the combustion chamber and the load-bearing external structure of the missile. The outer layer of the combustion chamber composite typically has a geometric and chemical structure so that it loses no more than 50% of its strength during the boost phase or at least during a period of 2 seconds after ignition of the engine.

The strength of the outer layer is influenced significantly by the geometric alignment of the reinforcing fibers. The fibers are typically aligned perpendicular to the longitudinal axis of the combustion chamber, of the nozzle or of the ring, and are preferably wound round the outer wall of the nozzle or the wall of the ring in the circumferential direction of the nozzle. The fiber hanks or bundles are preferably virtually parallel to one another or are crossed, with the crossing angle being no more than 45°. According to the invention, the volume fraction of fibers in the outer layer is at least 30%, preferably at least 45%. Preferred fibers are high-strength carbon fibers or graphite fibers, in particular in the form of fiber bundles or rovings.

As polymer matrix, use is made of thermally curable thermosets, in particular phenolic resins or epoxy resins, particularly preferably carbonizable polymers. This has the advantage that the thermal decomposition of the outer CFP layer made of the carbonizable polymers forms at least some stable CFC. Apart from the polymers customary for the production of CFP, it is also possible to use organosilicon polymers. These are preferably polymers whose pyrolysis due to the combustion temperatures result in formation of silicon ceramics or silicon carbide ceramics; particular preference is given to silanes, carbosilanes, silazanes or silicones. Ceramicization of the CFP significantly increases the thermal stability and the life of the outer layer. The outer layer for a nozzle has about the same thickness as the interior layer of fiber-reinforced ceramic, but can, depending on requirements, be made thicker or thinner than the interior layer of fiber-reinforced ceramic. According to the invention, the thickness of the outer layer for a nozzle is from 80 to 20% of the total thickness of the nozzle wall, preferably from 70 to 30%, particularly preferably from 60 to 40%. In the case of a ring, the thickness of the outer layer is, according to the invention, from 10 to 30% of the total thickness of the ring. Due to the high initial strength of the nozzle, the combustion chamber or the ring produced according to the invention by the outer CFP layer, the wall thickness of the nozzle or ring can be comparatively low. Likewise, an insulation layer or cooling facilities in the outer CFP layer can be omitted. Both have an advantageous effect in reducing the component weight and the wall thickness of the component and thus reduce the space required, so that more space is made available for installation of insulation material. In this way, any exterior structure of the missile, which due to its function must not exceed a particular temperature, can be appropriately protected.

Typical wall thicknesses of nozzles or rings configured according to the invention and comprising the interior layer and the outer layer are not more than 30 mm, preferably not more than 15 mm and particularly preferably in the range from 3 to 12 mm.

The interior layer of the combustion chamber, the nozzle or the ring is formed by a high-temperature-resistant fiber-reinforced ceramic. According to the invention, preference is given to using a C/SiC composite or a composite made up of C/C and C/SiC regions.

For the purposes of the present invention, a C/C material can be any carbon composite which is reinforced with carbon fibers and may comprise not only carbon but also compounds of further elements as additives. The matrix of the interior layer preferably comprises phases of silicon carbide together with phases of carbon and/or phases of silicon. It is further preferred that the matrix of the interior layer has a content of silicon carbide and/or silicon which decreases from the inside to the outside. In this way, there is a gradual transition between the interior layer of the C/SiC material and the C/C material (hereinafter also referred to as graded C/SiC). The graded structure is supported by the silicon being added in a deficiency with respect to the reaction with the free carbon to form silicon carbide. At least on the inside of the interior layer, i.e. the side coming into contact with the combustion gases, there is a C/SiC material. The inside surface layer of the interior layer is preferably made up virtually completely of SiC and/or Si or sealed by SiC and/or Si. In any case, however, the mass fraction of free or chemically bound silicon in the inner surface layer is at least 50%, preferably at least 55% and particularly preferably at least 60%. For the present purposes, "sealed" means that the pores accessible from the surface are completely or virtually completely (i.e. at least 90%) closed. Sealing is advantageously achieved by means of a partial excess of silicon in the liquid silicization of the C/C green body.

The mass fraction of free or chemically bound silicon in the matrix of the interior layer in the outside facing away from the combustion gases is preferably not more than 30%. It is further preferred that the mass fraction of carbon in the outside of the interior layer facing away from the combustion gases is at least 95%. In a further preferred embodiment, the reinforcing fibers of the interior layer have a mean length of at least 50 mm. It is likewise preferred that the reinforcing fibers of the outer layer have a mean length of at least 50 mm. The volume fraction of fibers in the outer layer is preferably at least 35%. The polymer in the outer layer preferably comprises carbonizable polymers, with the mass of the pyrolysis residue of these polymers being at least 35% of the mass of the polymers. In a further, preferred embodiment, the mean thickness of the outer layer is less than the mean thickness of the interior layer.

The process for producing the multilayer composite comprises the steps:

1. producing an intermediate body which is reinforced with carbon fibers and has a matrix comprising carbon and has the shape of the interior layer,
2. silicizing at least the inside of the intermediate body by means of a silicon melt,
3. covering the outside of the silicized intermediate body with a polymer-impregnated woven fabric, polymer-impregnated fiber bundles or polymer-impregnated fiber layups, with the material of the fibers and woven fabrics being carbon and the polymer being thermally curable, and
4. curing the outer layer formed by the covering to form a polymer reinforced with carbon fibers.

The production of a C/C intermediate body in a known manner is followed by liquid silicization of the porous carbon-containing green body (C/C green body), with at least the inside of the interior layer of the nozzle, combustion chamber or ring formed therefrom being converted into C/SiC. For this purpose, a C/C green body having the shape of the interior layer is produced by known methods, but this is, according to the invention, brought directly to a shape close to the final contours in order to achieve maximum mechanical strength from the available wall thickness geometry and to be able to ensure inexpensive manufacture. It is possible for intermediate bodies having step changes in wall thickness in order to meet different strength requirements in the component and to form recesses or reinforcing structures to be produced directly in this way.

The C/C green body can be produced from short or long fibers, or from bundled, in particular coated, fibers. When long fibers are used, the winding technique and the prepreg technique are preferably employed to build up the intermediate body for producing the C/C green body. In such a process, a plurality of layers of woven carbon fiber fabrics or rovings can be superposed on one another. When long fibers are used, the mean fiber length is at least 50 mm.

This intermediate body is carbonized in a known manner to give a C/C green body. If precise adherence to contours and dimensions is required, the green body is preferably supported by means of a suitable device and fixed in place to avoid distortion. Preference is also given to further densifying this green body with carbon once or preferably several times. This is achieved by impregnating the porous green body with liquid resins and subsequently heating the impregnated body in the absence of oxygen, so that the resins firstly set or cure to form a thermoset phase and the cured resins are then decomposed to form carbon residues. In the subsequent step, the C/C body is infiltrated with liquid silicon, with the silicon melt preferably being introduced via the inside of the interior wall of the future nozzle, combustion chamber or ring. This usually produces a silicon or SiC gradient with the concentration decreasing from the inside towards the outside of the interior layer. This concentration may also drop to virtually 0% at the outside of the interior layer. The mass fraction of silicon (in bound and free form) in the outer zone of the ceramic composite is preferably not more than 30%. After the silicization, the composite bodies formed are machined as ceramics to produce the necessary connections or projections or recesses for fastening purposes.

The outer layer of CFP is then applied to the outside. The reinforcing fibers here preferably have a mean length of at least 50 mm. When long fibers are used, it is possible to use, in particular, the winding technique and the prepreg technique for covering the interior layer of the multilayer composite with the material of the outer layer. In this case too, a plurality of layers of woven carbon fiber fabrics or rovings can be superimposed on each other. The long fibers of the fiber bundles, rovings or fabrics are preferably aligned in the circumferential direction and, depending on requirements, applied in different wall thicknesses over the outer surface of the interior wall to bring the body close to the final contours, particularly preferably only in the regions necessary to meet strength requirements. Machining of the applied CFP layer is preferably avoided. The long fibers are embedded in curable polymers which are cured in a known manner to produce the CFP.

As curable polymers, preference is given to phenolic resins, epoxy resins, polyester resins, polyurethane resins and organosilicon polymers.

The multilayer composites of the invention are particularly suitable for producing combustion chambers and nozzles for rockets.

The invention claimed is:

1. A multilayer composite for combustion chambers or nozzles of missiles, comprising an interior layer in contact with the combustion gases and an outer layer, wherein the interior layer is a fiber-reinforced ceramic whose matrix comprises phases of carbon and/or phases of silicon carbide and the outer layer is a polymer reinforced with carbon fibers.

2. The composite as claimed in claim 1, wherein the matrix of the interior layer comprises phases of silicon carbide and phases of carbon and/or phases of silicon.

3. The composite as claimed in claim 1, wherein the matrix of the interior layer has a content of silicon carbide and/or silicon which decreases from the inside towards the outer surface.

4. The composite as claimed in claim 1, wherein the mass fraction of free or chemically bound silicon in the matrix of the interior layer in the inside which is in contact with the combustion gases is at least 50%.

5. The composite as claimed in claim 1, wherein the mass fraction of free or chemically bound silicon in the matrix of the interior layer's outside surface which faces away from the combustion gases is not more than 30%.

6. The composite as claimed in claim 1, wherein the mass fraction of carbon in the outside surface of the interior layer which faces away from the combustion gases is at least 95%.

7. The composite as claimed in claim 1, wherein the reinforcing fibers of the interior layer have a mean length of at least 50 mm.

8. The composite as claimed in claim 1, wherein the reinforcing fibers of the outer layer have a mean length of at least 50 mm.

9. The composite as claimed in claim 1, wherein the volume fraction of fibers in the outer layer is at least 35%.

10. The composite as claimed in claim 1, wherein the polymer of the outer layer comprises carbonizable polymers and the mass of the pyrolysis residue of these polymers is at least 35% of the mass of the polymers.

11. The composite as claimed in claim 1, wherein the mean thickness of the outer layer is less than the mean thickness of the interior layer.

12. A method of use of composites as claimed in claim 1 comprising forming the composites into combustion chambers or nozzles of rockets.

* * * * *